Oct. 21, 1958
J. F. NAYLOR
2,856,870
MANUFACTURE OF EDIBLE DOUGH PRODUCTS
Filed June 16, 1954
3 Sheets-Sheet 1
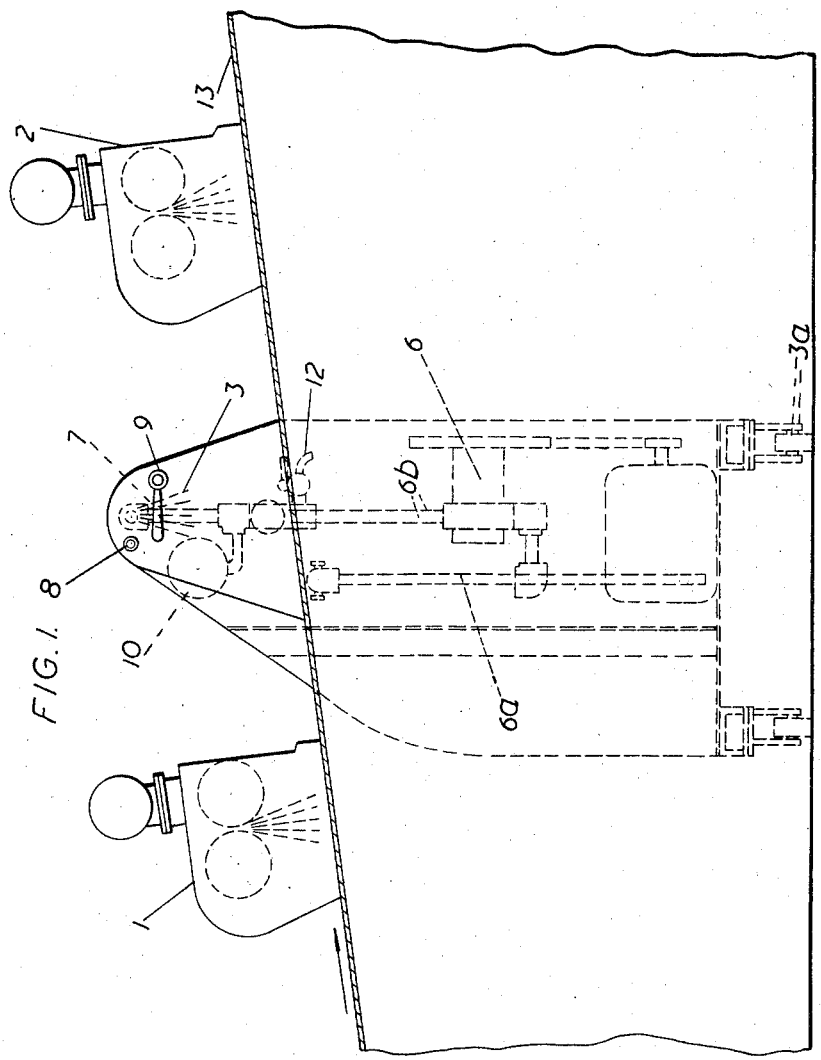
Inventor
JOSEPH FRANCIS NAYLOR
By Mead, Browne, Schuyler & Beveridge
Attorneys

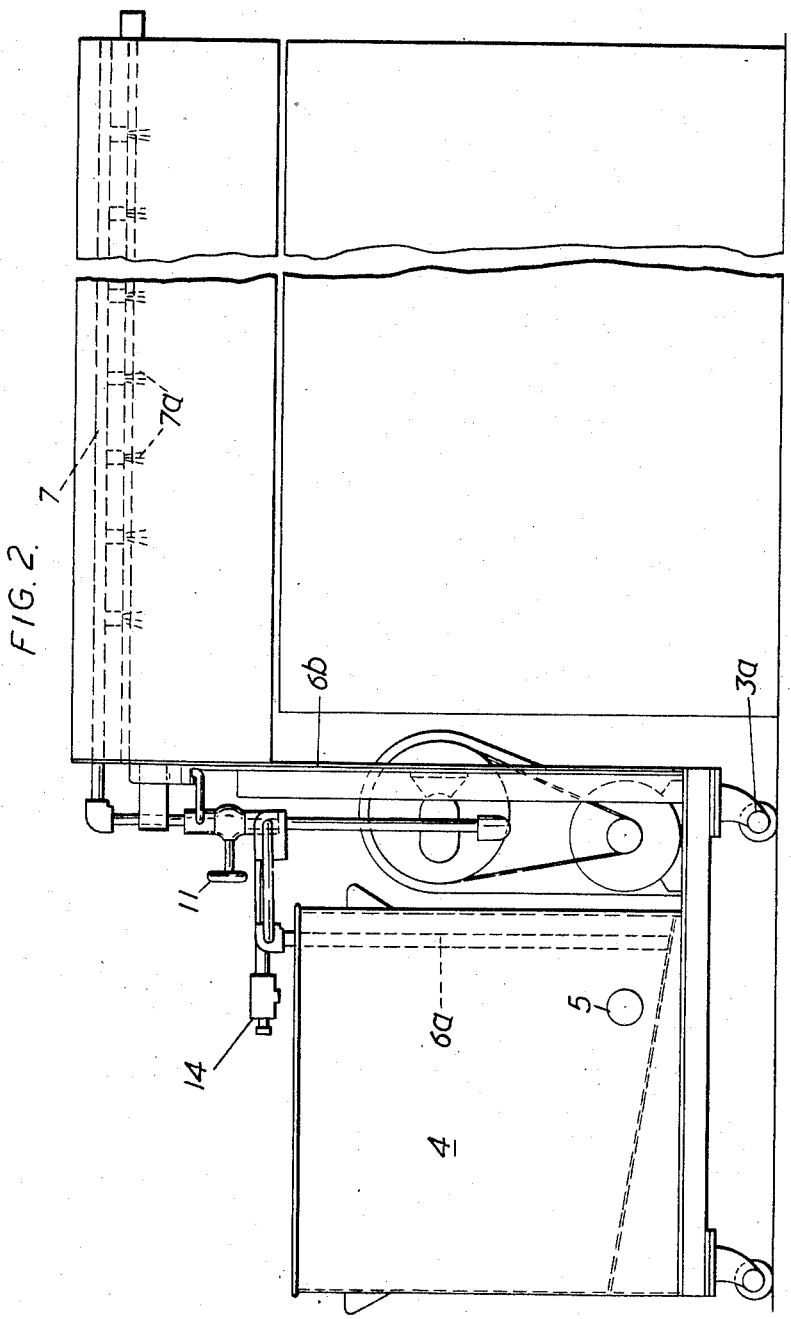

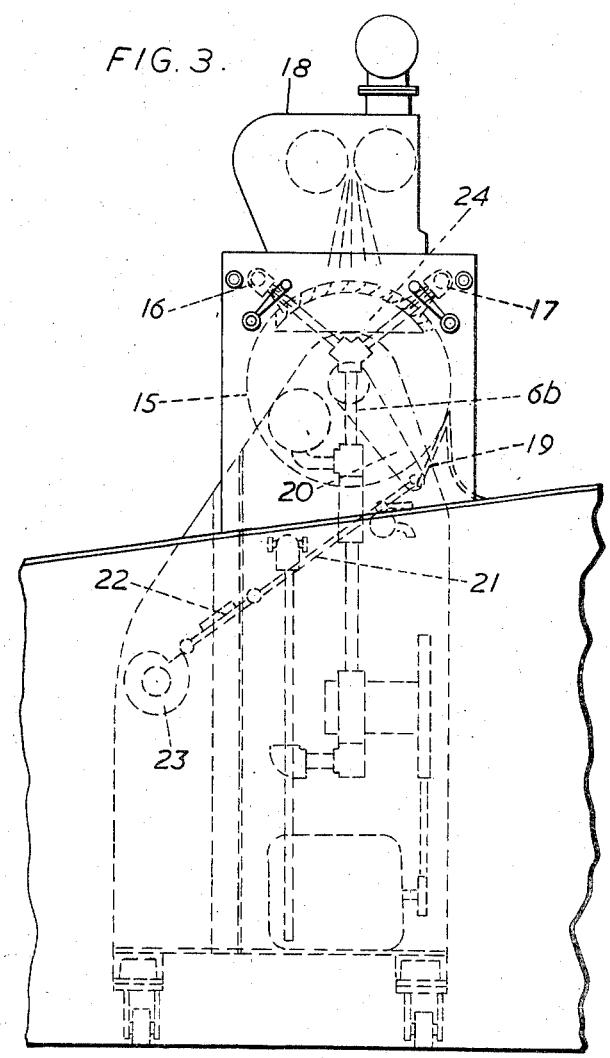

United States Patent Office 2,856,870
Patented Oct. 21, 1958

2,856,870

MANUFACTURE OF EDIBLE DOUGH PRODUCTS

Joseph Francis Naylor, Newton-le-Willows, England, assignor to T. & T. Vicars Limited, Newton-le-Willows, England, and W. & R. Jacob & Co. Limited, Dublin, Ireland Application June 16, 1954, Serial No. 437,172

Claims priority, application Great Britain June 17, 1953

3 Claims. (Cl. 107—54)

The present invention relates to improvements in the manufacture of edible dough products such as are generally known as "crackers" or "biscuit puffs."

Hitherto in the manufacture of such goods it has been usual to interleave a number of sheets of dough with a material formed by rubbing globules or pieces of fat into bakers' flour and then rolling and, if desired, folding and re-rolling the said multiple layers to form a sheet or web of dough from which biscuits are cut which, on baking, are of a flaky and of a good texture.

Generally in the making up of a dough sheet for the manufacture of bakers' products of this type, it has been usual to apply a mixture of flour and fat to the surface of a dough sheet or web prior to combining this with a second sheet in passage through squeeze rolls.

It has also been suggested to spray melted fat or butter or flour or sugar on to the two surfaces of a vertically descending web of dough.

According to the present invention, fat in liquid form is dispersed by spraying and combined in intimate and even distribution with a dispersion of flour particles as part of a continuous operation which includes the application of the fat and flour to the surface of a dough web or sheet, and is performed wholly in close proximity thereto.

In a preferred method of performing this operation, a sheet or web of dough travelling horizontally or at an angle of less than 45° to the horizontal, may be dusted with flour to form a dispersion of flour over its surface, and liquid fat sprayed thereupon.

In a further arrangement, a volume of liquified fat may be taken up upon a rotating surface moving relatively to a scraper and by which small congealed particles are removed and allowed to fall by gravity upon a moving dough web or sheet. The rotating surface, and also the scraper, may be provided with means to control the temperature thereof, there being also the possibility of varying the temperature over the area of the rotating surface. Further the scraper may be provided with means to vibrate or oscillate it thereby assisting the transference of the congealed fat from the rotating surface. The rotating surface may be sprayed with liquid fat, dusted with flour and, if desired, again sprayed with fat and the resultant mixture scraped off as aforesaid.

The invention will be further described with reference to the accompanying drawings illustrating two forms of apparatus, taken by way of example, suitable for carrying out the invention.

In the drawings:

Fig. 1 shows in side elevation an apparatus in which a fat sprinkler is interposed between two flour dusters in the line of travel of a moving dough sheet.

Fig. 2 is a front elevation of the fat sprinkler, and

Fig. 3 shows in side elevation the second form of apparatus where the application of fat and flour to the moving dough sheet is through the intermediary of a rotatable drum.

Referring firstly to the form of apparatus shown in Figs. 1 and 2, two flour dusting units 1, 2 of known construction, are disposed, spaced apart and arranged in relation to a conveyor band moving upwardly at a slight angle to the horizontal to dust with flour the upper surface of a dough sheet carried on the conveyor band. Interposed between the two dusters 1, 2 is a fat sprinkler, denoted generally 3, constructed as a movable unit on casters 3a. The sprinkler unit comprises a tank 4 having an inclined bottom to contain liquid or liquified fat which is maintained at a temperature suitable for spraying by a heating element 5 extending across the width of the interior of the tank and a motor-driven gear pump 6 drawing from the lowest point of the tank 4 through an inlet pipe 6a and delivering the fat through an outlet pipe 6b to a spray tube 7 which extends in the manner of a cantilever for positioning over the whole width of the dough sheet and which is provided at intervals along its length with downwardly opening nozzles 7a for ejection of the fat in divergent jets or sprays on to dough sheet surface below. A heating element, indicated by 8, acts to maintain the temperature of the fat in the spray tube 7.

Additional features appropriate to operation and control of the sprinkler unit are means to clean the nozzles 7a, carried for instance by a spindle 9, a pressure gauge 10 registering the fat delivery pressure in the outlet pipe 6b, a control valve 11 in the latter-mentioned pipe, a draining cock 12 and a release valve 14.

Into a dispersion of flour particles dusted lightly on the upper surface of the dough sheet 13 by free fall from the duster 1, globules of congealing fat are distributed intimately and evenly by the sprinkler unit as the dough sheet is conveyed forwardly. A further dusting with flour then takes place at the duster 2 and the dough sheet, with the resultant fat and flour combination thereon, travels onwards for lamination, interleaving the combination between layers of dough, and consolidation by passage through squeeze rollers.

In Fig. 3 a drum 15 is supported for rotation by means (not shown) transversely of and above the conveyor band. The sprinkler unit operative in conjunction with this drum comprises the features hereinbefore enumerated with reference to Figs. 1 and 2 with the exception that the outlet pipe 6b from the pump is branched to feed two spray tubes 16, 17 angularly displaced with respect to the peripheral surface of the drum. Supported at the top of frame in which the drum is journalled is a flour dusting unit 18 arranged to permit the free fall of flour into the angle between the spray tubes 16, 17 over substantially the whole length of the drum. A scraper blade 19, likewise extending over the length of the drum, is held in contact with the peripheral surface of the drum by radial arms 20 oscillatable about the drum axis. To oscillate these arms and so work the scraper blade back and forth over the surface of the drum, a rod 21 attached at one end to one of the arms and passing through a guide 22 bears at the other end against the profile of a rotating cam 23.

In operation, the drum 15 is rotated clockwise as seen in Fig. 3 and globules of sprayed fat, flour and further fat are deposited successively on the upper peripheral surface thereof to form an intimate and even distribution of the one material throughout the other. The drum is cooled, for instance, by the circulation of a cooling medium through a hollow space 24 from which the medium may be withdrawn through perforations in an end or both ends of the drum, and in this way promote congealing of the fat and adherence to the surface of the drum. The fat and flour agglomerated on the surface of the drum moves therewith into the area of action of the scraper blade which scrapes the agglomeration off the surface allowing it to fall in a stream on to the upper surface of the dough sheet travelling on the conveyor band below. Joggling of the scraper blade reduces any tendency of the fat and flour to accumulate thereon and the frequency and amplitude of the joggling is determined in relation to the speed of rotation of the drum primarily to achieve this object.

I claim:

1. In the manufacture of edible dough products, a method comprising the steps of continuously spraying fat in a liquid form on to a moving surface, continuously depositing a dispersion of flour on to said moving surface to obtain a homogeneous layer of fat and flour, causing the fat in said homogeneous layer to congeal, moving a dough sheet continuously in close proximity to said homogeneous layer of fat and flour on said moving surface, scraping said homogeneous layer of fat and flour from said surface and allowing it to fall on to the upper surface of said moving dough sheet.

2. An apparatus for the application of a homogeneous layer of fat and flour to a moving dough sheet, comprising a frame, a drum journalled in said frame for positioning over said dough sheet, means to rotate said drum, spraying means for fat in liquid form directed to apply fat to an upper portion of the cylindrical surface of said drum, a flour feed means mounted on said frame above said drum and adapted to deposit on said upper portion of said cylindrical surface of said drum a dispersion of flour particles to form with said fat a homogeneous layer, cooling means arranged within said drum to congeal the fat in said homogeneous layer, and a scraper mounted within said frame and in contact with said cylindrical surface to remove said homogeneous layer of congealed fat and flour from that surface for transfer to the upper surface of said dough sheet.

3. An apparatus as set forth in claim 2 comprising means adapted to impart a joggling motion to said scraper whereby the removal of said homogeneous layer of congealed fat and flour from said cylindrical surface of said drum is facilitated.

References Cited in the file of this patent

UNITED STATES PATENTS

| Re. 22,399 | Fonken | Dec. 7, 1943 |
| 698,035 | Mannie | Apr. 22, 1902 |
| 774,680 | Lynds | Nov. 8, 1904 |
| 889,465 | Keller et al. | June 2, 1908 |
| 1,339,087 | Artkop | May 4, 1920 |
| 1,674,229 | Scruggs | June 19, 1928 |
| 1,805,018 | Scruggs | May 12, 1931 |
| 2,073,567 | Sciarra | Mar. 9, 1937 |
| 2,337,539 | Buechek | Dec. 28, 1943 |
| 2,357,679 | Moench, Jr. | Sept. 5, 1944 |
| 2,577,925 | Sternbach | Dec. 11, 1951 |